June 11, 1968 JAMES E. WEBB 3,388,387
ADMINISTRATOR OF THE NATIONAL
AERONAUTICS AND SPACE ADMINISTRATION
DRIVE CIRCUIT UTILIZING TWO CORES
Filed July 7, 1964

INVENTOR
LAWRENCE J. ZOTTARELLI
BY
ATTORNEY

United States Patent Office 3,388,387
Patented June 11, 1968

3,388,387
DRIVE CIRCUIT UTILIZING TWO CORES
James E. Webb, Administrator of the National Aeronautics and Space Administration, with respect to an invention of Lawrence J. Zottarelli, La Canada, Calif.
Filed July 7, 1964, Ser. No. 380,965
6 Claims. (Cl. 340—174)

ORIGIN OF THE INVENTION

Figures 1, 2:
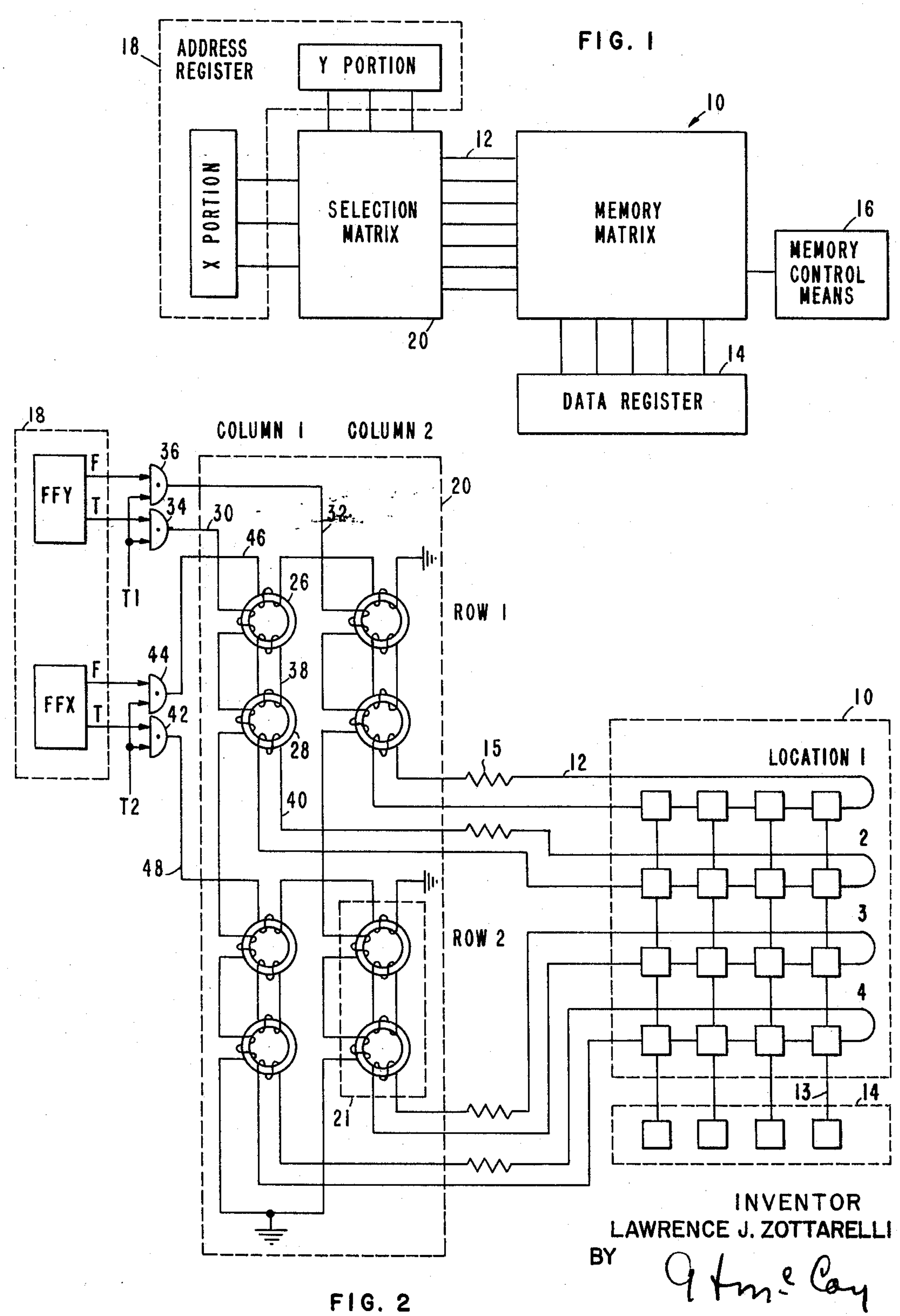

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates generally to improvements in magnetic core circuit apparatus of the type which finds particular utility in selection matrices for digital memories.

Digital memories comprised of a matrix of discrete storage elements arranged to define a plurality of word locations are well known in the art. In order to access a selected location in such a memory, a pulse is applied to a drive line or lines coupled to the elements of the selected location. The selected location is usually identified by coded information stored in a selection register. A decoding circuit of some sort is usually coupled between the selection register and the memory matrix.

The characteristics of the pulse applied to the drive line are often critical. For example, in a non-destructive readout memory matrix, stored information can be read non-destructively only if a pulse of a first polarity having an amplitude above a certain threshold is applied to the drive line. If an opposite polarity pulse is applied to the drive line, the stored information can be destroyed.

One type of decoding circuit which is used fairly frequently is comprised of a selection matrix of magnetic cores, each core in the selection matrix being coupled to the drive line of a different memory matrix location. The selection matrix is operated by initially applying a set signal to the column of cores including the core associated with the drive line to be selected. As a result, all of the cores in that column are driven to a set state. A reset signal is then applied to the row of cores including the core associated with the drive line to be selected. Of course, the only core in the selection matrix to switch in response to the reset signal will be the core at the intersection of the selected row and column. The switching of the unique core can be used to apply a pulse to the drive line coupled thereto. In order to prevent an opposite polarity pulse from being applied to the drive line when the column cores are initially switched, a diode is usually connected in series with the drive line. The reliability of the diode is thus a very critical factor in the circuit operation.

It is an object of the present invention to provide a selection matrix which has higher reliability than heretofore known devices.

More particularly, it is an object of the present invention to provide a selection matrix of the foregoing type which develops unipolar output pulses without utilizing the diode normally employed in prior art selection matrices.

In addition to finding utility in the selection matrix of the type described, many other applications exist in which it is desirable to obtain a single unipolar output pulse response to a magnetic core being switched from a first to a second and back to a first state. Accordingly, it is an additional object of the present invention to provide highly reliable circuit means for use in conjunction with a magnetic core for developing this response.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of a conventional memory system illustrating a memory matrix, a data register, an address register, and a selection matrix responsive to information stored in the address register for selecting a unique location in the memory matrix; and FIGURE 2 is a schematic diagram of a memory system of the type generally illustrated in FIGURE 1 constructed in accordance with the present invention.

Attention is now called to FIGURE 1 of the drawings which illustrates in block diagram form a conventional memory system of the type employed in digital data processing systems. The memory system of FIGURE 1 includes a memory matrix 10 which is usually comprised of a plurality of discrete storage elements, for example of the magnetic core variety. The storage elements of the matrix 10 are usually arranged to define a plurality of word locations. A different word drive line 12 is coupled to the storage elements of each different location in the memory matrix 10. By applying an appropriate signal to a selected drive line 12, the word location associated therewith can be accessed so that either the information stored in the data register 14 is stored in the accessed location or the information stored in the accessed location is entered into the data register 14. Whether information is written into the memory matrix or read therefrom, is controlled by a memory control means 16.

The particular word drive line 12 to which appropriate pulses are applied is determined by information stored in an address register 18. The address register 18 is illustrated as being comprised of a Y portion and an X portion. Connected between the address register 18 and the drive lines 12 is a selection matrix 20 which is responsive to coded information stored in the address register 18 for selecting one of the drive lines. The particular type of pulse which must be provided by the selection matrix to the lines 12 depends of course upon the particular characteristics of the memory matrix 10. It is often necessary that the drive pulse be of one polarity and have an amplitude above a certain threshold in order to be effective. In many cases, it is essential to prevent opposite polarity pulses from being applied to the drive lines 12 inasmuch as such opposite polarity pulses can destroy information stored in the memory matrix 10.

A typical prior art selection matrix for providing a unipolar output pulse in response to coded information stored in the address register often comprises a matrix of magnetic cores, each core being coupled to a different one of the drive lines 12. The cores in the selection matrix are arranged in rows and columns. The coded information stored in the Y portion of the address register 18 determines the column of cores to which a set signal is applied. The information in the X portion of the address register determines the row of cores to which a reset signal is subsequently applied. It should be apparent that only at the intersection of the selected row and column, will a core be switched first to a set state and then back to a reset state. The switching of the unique core to the reset state can be used to develop a unipolar output pulse for application to the drive line 12 coupled thereto. In order to prevent the cores in the selection matrix from applying pulses to the drive lines 12 when they are initially set in response to the information in the Y portion of the address register, most prior art selection matrices employ a diode in series with each of the word drive lines. Inasmuch as diodes are not as reliable as sometimes desired, attempts have been made to limit the output of the selection matrix to unipolar pulses without requiring the use of a diode. FIGURE 2 illustrates a preferred embodiment of the present invention which provides a unipolar output pulse in response to a magnetic core being switched from a set or first state of magnetic remanence to a reset or second state of magnetic remanence then back to the set state.

Attention is now called to FIGURE 2 which illustrates a preferred embodiment of the invention in the form of a selection matrix 20 for use in a memory system as shown in FIGURE 1. FIGURE 2 illustrates a memory matrix 10 including four memory locations each comprised of a plurality of discrete storage elements, which can, for example, be single or multi-aperture magnetic cores. A different word drive line 12 is coupled to all of the storage elements of each of the locations. Memory matrix sense windings 13 couple the storage elements in the matrix 10 to the stages of the data register 14.

Since the exemplary memory matrix 10 of FIGURE 2 includes only four locations, the address register 18 requires only two binary stages to specify a particular location. The stages will be respectively identified as flip-flop Y (FFY) and flip-flop X (FFX) which respectively correspond to the Y and X portions of the address register shown in FIGURE 1.

The selection matrix 20 includes four core pairs 21, each pair being associated with a different one of the word drive lines 12. The core pairs are arranged in rows and columns such that the core pairs in column 1 of the selection matrix 20 are associated with the drive lines of locations 2 and 4 of the memory matrix 10. The core pairs of column 2 of the selection matrix 20 are associated with the drive lines of locations 1 and 3 of the memory matrix 10. On the other hand, the core pairs of row 1 of the selection matrix are associated with drive lines of locations 1 and 2 of the memory matrix and the core pairs of row 2 of the selection matrix are associated with drive lines of locations 3 and 4 of the memory matrix 10.

More particularly, each core pair includes a first core 26 which comprises a square loop magnetic core capable of assuming first and second remanent states. The second core 28 in each pair is a linear core. The column 1 and 2 windings 30 and 32 are respectively derived from the true and false output terminals of flip-flop FFY via And gates 34 and 36. The And gates 34 and 36 are enabled at time T1 to thereby apply a pulse to either winding 30 or 32. The winding 30 is similarly wound on both cores in each core pair 21 in column 1 of the selection matrix 20. The winding 32 is likewise similarly wound on all of the cores in column 2 of the selection matrix.

The application of a pulse to winding 30 or 32 switches all of the first cores 26 coupled thereto from a first to a second state. The affect of the pulse on the column winding develops a clockwise magnetic field in the linear cores 28 coupled thereto. The first and second magnetic cores 26 and 28 in each core pair are coupled by a winding 38 which is responsive to the first core 26 switching to a second state for developing, by transformer coupling, a counterclockwise magnetic field in the second core 28. Thus, in response to the application of a pulse to one of the column windings at time T1, all of the cores 26 coupled thereto will be switched to a second state while oppositely oriented magnetic fields will be developed in the cores 28 which substantially cancel each other. A sense winding 40 is wound on the core 28 of each core pair and is coupled to the drive line 12 associated with that core pair. As a consequence of the flux cancellation in core 28 as a result of a pulse being applied to the column winding, no output signal will be induced in the winding 40 and thus, no pulse will be applied to the drive line 12.

The true and false output terminals of the flip-flop X are respectively connected to the input of And gates 42 and 44. These And gates are enabled at time T2. The output of And gate 44 is connected to the row 1 winding 46 of the selection matrix 20. The winding 46 is similarly wound on the first cores 26 of the row 1 core pairs. The output of And gate 42 is connected to winding 48 which likewise is similarly wound on the cores 26 of the row 2 core pairs. At time T2, a pulse will be applied to either winding 46 or 48 to thus switch the cores coupled thereto to a reset state. Of course, only the core which had previously been switched to a set state will actually switch back to a reset state. The switching of one of the cores 26 to a reset state will be transformer coupled to core 28 to develop a clockwise magnetic field therein. The development of the field in core 28 will in turn induce a pulse in the winding 40 coupled thereto. This pulse will of course be applied to the drive line 12 coupled thereto to enable the selected location in the memory matrix 10 to be accessed. A current limiting resistance 15 is connected in series with each of the drive lines 12.

Thus, it should be appreciated that an apparatus has been introduced herein which permits a single unipolar output pulse to be developed in response to a square loop magnetic core switching from a first to a second and back to a first state. The apparatus employs a linear magnetic core in which substantially cancelling magnetic fields are developed in response to the square loop core switching from a first to a second state and in which a non-cancelling magnetic field is developed when the square loop core switches from a second to a first state. Utilization of a linear core in accordance with the teachings herein in lieu of a diode as employed in the prior art, considerably improves the reliability of a system in which the apparatus is employed.

Although particular attention has been directed to a selection matrix comprising a preferred embodiment of the present invention, it is stressed that many other significant applications exist in which it is desired to develop a single unipolar output pulse in response to a square loop core switching from a first to a second and back to a first state. Thus, the invention should not be interpreted as being limited to the embodiment shown and it should be understood that the memory matrix 10 illustrated in FIGURE 2 only comprises an exemplary load which can be coupled to the winding 40.

What is claimed is:

1. In combination with a memory comprised of a plurality of storage elements arranged to define a plurality of locations, each location having a drive line coupled to the elements thereof, decoding apparatus for applying a unipolar pulse to a selected drive line, said apparatus comprising a plurality of magnetic core pairs, each pair including first and second magnetic cores; a plurality of sense windings, each sense winding coupling a different one of said second magnetic cores to a different one of said drive lines; first means for concurrently applying signals to the first and second cores of selected pairs for switching the first core thereof to a second state and for developing in the second core thereof a magnetic field oriented in a first direction; second means for applying a signal to selected pairs for switching the first core thereof to a first state; winding means coupling said first and second cores of each of said pairs for developing in said second cores a magnetic field oriented in a second direction in response to the first core being switched to a second state and for developing a magnetic field oriented in a first direction in response to said first core being switched to a first state.

2. The combination of claim 1 wherein each of said first cores comprises a square loop core and each of said second cores comprises a linear core.

3. In combination with a first magnetic core capable of defining first and second states of magnetic remanence, means for switching said first magnetic core and for developing a first polarity output pulse only in response to said first magnetic core being switched from said first to said second state, said means comprising a second magnetic core; a first winding coupled to said first and second magnetic cores; a second winding coupled to said second magnetic core; means for applying a signal to said first winding for switching said first magnetic core to said second state and for developing a magnetic field oriented in a first direction in said second magnetic core; third winding means coupling said first magnetic core to said second magnetic core for developing a magnetic field oriented in a second direction in said second magnetic core in response to said first magnetic core being switched to said second state; means for applying a signal to said second winding for switching said first magnetic core to said first state whereby said third winding means will develop a magnetic field oriented in a first direction in said second magnetic core; and sense winding means coupled to said second magnetic core.

4. In combination with a first magnetic core capable of defining first and second states of magnetic remanence, means for switching said first magnetic core and for developing a first polarity output pulse only in response to said first magnetic core being switched from said first to said second state, said means comprising first means for simultaneously applying signals to said first and second magnetic cores for switching said first magnetic core to a second state and for developing a magnetic field in said second magnetic core oriented in a first direction; second means for applying a signal to said first magnetic core for switching said first magnetic core to a first state; and means responsive to said first magnetic core switching to said first and second states for respectively applying signals to said second magnetic core for developing magnetic fields therein oriented in first and second directions.

5. The combination of claim 4 wherein said first and second means are successively activated.

6. The combination of claim 4 wherein said first and second magnetic cores respectively comprise a square loop core and a linear core.

References Cited

UNITED STATES PATENTS 3,070,706 12/1962 Bloch et al. ---------- 307—88

BERNARD KONICK, *Primary Examiner.*

V. P. CANNEY, *Assistant Examiner.*